United States Patent
Manz et al.

(10) Patent No.: US 12,214,412 B2
(45) Date of Patent: Feb. 4, 2025

(54) APPARATUS FOR CLINCH JOINING

(71) Applicant: TOX PRESSOTECHNIK GMBH & CO. KG, Weingarten (DE)

(72) Inventors: Markus Manz, Weingarten (DE); Michael Badent, Weingarten (DE); Berno Maucher, Bergatreute (DE)

(73) Assignee: TOX PRESSOTECHNIK GmbH & Co. KG, Weingarten (DE)

( * ) Notice: Subject to any disclaimer, the term of this patent is extended or adjusted under 35 U.S.C. 154(b) by 0 days.

(21) Appl. No.: 18/411,311

(22) Filed: Jan. 12, 2024

(65) Prior Publication Data
US 2024/0139797 A1    May 2, 2024

Related U.S. Application Data

(63) Continuation of application No. PCT/EP2022/071151, filed on Jul. 28, 2022.

(30) Foreign Application Priority Data

Aug. 5, 2021 (DE) ...................... 10 2021 120 409.7

(51) Int. Cl.
    *B21J 15/30*      (2006.01)
    *B21D 39/03*      (2006.01)

(52) U.S. Cl.
    CPC ............ *B21J 15/30* (2013.01); *B21D 39/031* (2013.01)

(58) Field of Classification Search
    CPC . B21J 15/10; B21J 15/30; B21J 15/025; B21J 15/28; B21D 39/03; B21D 39/031;
(Continued)

(56) References Cited

U.S. PATENT DOCUMENTS

| | | | | |
|---|---|---|---|---|
| 2,487,262 A | * | 11/1949 | Mueller | ................... B21J 15/20 72/407 |
| 6,397,654 B1 | | 6/2002 | Moeser | |
| 2006/0200273 A1 | | 9/2006 | Lang | |

FOREIGN PATENT DOCUMENTS

DE            92 17 181 U1    4/1993
DE    10 2005 009 526 A1    9/2006
(Continued)

OTHER PUBLICATIONS

English translation of the International Preliminary Report on Patentability (Chapter II) dated Jun. 21, 2023 (Application No. PCT/EP2022/071151).

*Primary Examiner* — Jared O Brown
(74) *Attorney, Agent, or Firm* — BURR PATENT LAW, PLLC (57) ABSTRACT

A device for clinch joining a component, including a retaining portion for positioning the device at a holder and a main body with a die unit and a punch unit, the main body being mounted on the retaining portion by a bearing point. A drive unit reversibly drives a linearly movable actuating element coupled to a punch or to a die element, along a joining axis of the device to act on the component present between the punch unit and the die unit. The main body moves relative to the retaining portion at the bearing point. A control apparatus between the actuating element and the retaining portion positions the main body relative to the retaining portion in accordance with the position of the actuating element along the joining axis as a result of the driven movement of the actuating element.

11 Claims, 3 Drawing Sheets

(58) Field of Classification Search
CPC .............. B30B 15/047; Y10T 29/5377; Y10T 29/49956; B23P 19/062
See application file for complete search history.

(56) References Cited

FOREIGN PATENT DOCUMENTS

| | | |
|---|---|---|
| DE | 10 2014 200 962 A1 | 7/2015 |
| DE | 10 2018 205 526 A1 | 10/2019 |
| WO | 2014/025608 A1 | 2/2014 |

\* cited by examiner

APPARATUS FOR CLINCH JOINING

CROSS REFERENCE TO RELATED APPLICATIONS

This application is a continuation of International Application No. PCT/EP2022/071151 filed Jul. 28, 2022, which designated the United States, and claims the benefit under 35 USC § 119(a)-(d) of German Application No. 10 2021 120 409.7 filed Aug. 5, 2021, the entireties of which are incorporated herein by reference.

FIELD OF THE INVENTION

The present invention relates to an apparatus for clinch joining.

BACKGROUND OF THE INVENTION

In apparatuses, such as tools for forming processing of workpieces, clinching or stamping riveting tongs or joining tongs for setting connecting or functional elements, such as bolts or nuts, different machine concepts are configured for industrial applications. The machine concepts also advantageously relate to supplying and moving the workpieces and/or components onward. Such apparatuses for acting on workpiece portions or for clinching are also generally referred to as joining tongs below.

Preferably, press-in elements may be understood to be functional elements and in the set state on the workpiece have an additional function in an outward direction, for example, a connecting or fixing portion, such as, for example, an external thread for connecting the connecting or fixing portion to another portion.

The following applications in the above-described arrangements are intended to be differentiated, for example:
  robot-guided joining tools on a robot, wherein the joining tool is guided by the robot toward the component,
  robot-equipped joining tongs, wherein the component is present on the robot and is guided by the robot toward the joining tool,
  manually equipped joining tongs,
  machine-integrated joining tongs, wherein the set of joining tongs is fixed or can be moved on spatially defined movement axes, and
  wherein the component is supplied and/or discharged by, for example, a transfer system, such as, for example, a rotary indexing table or a linear transfer system.
  DE 92 17 181 U is referred to as prior art document.

SUMMARY OF THE INVENTION

An object of the present invention is to improve the apparatuses or joining tongs which are explained in the introduction. In particular, free-moving problems in such apparatuses are intended to be eliminated in a simple manner. Furthermore, disadvantages as a result of frequently occurring critical cycle times are intended to be minimized. Critical cycle times are particularly characterized by a comparatively long introduction or approach time of the joining tongs toward the component and/or a comparatively long free-moving time of the joining tongs away from the component.

The present invention is based on an apparatus for clinching a component or for setting a joining element or a functional element on a component, comprising a retention portion, with which the apparatus can be positioned on a receiving member in the environment, and a base member which is supported via a bearing location on the retention portion, and wherein a bottom die unit having a bottom die element is received on the base member and a stamp unit which is opposite the bottom die unit and which has a stamp is received, wherein there is provided in order to move the stamp and/or the bottom die element a drive unit which reversibly drives a linearly movable actuation element, which is coupled to the stamp or the bottom die element, along a joining axis of the apparatus in order to act on the component which is present between the stamp unit and the bottom die unit.

The term "set of joining tongs" is used below instead of the term "apparatus" in an equivalent manner and, in particular, not in a limiting manner with respect to the joining.

The central notion of the present invention involves the base member being movable via the bearing location relative to the retention portion and wherein a control device is constructed between the actuation element and the retention portion in such a manner that the position of the base member relative to the retention portion is predetermined in accordance with the position of the actuation element along the joining axis as a result of the driven movement of the actuation element. The control device forms a mechanical coupling, via which the actuation element, for example, a working piston of a drive unit with a piston/cylinder unit, is connected, preferably permanently, to the retention portion, such as a retention frame or machine frame.

With the control device, a movement coupling can be provided between the driven linear movement of the actuation element and the movement of the base member relative to the retention portion. The linear movement of the actuation element is preferably carried out relative to a fixed portion, on which the actuation element is movably supported. The fixed portion is, for example, a housing which surrounds the actuation element and which has a roller bearing device between the housing and the actuation element.

It is advantageously possible to carry out a compensation movement, for example, of a portion of the apparatus or the base member, which is connected to the stamp side and/or the bottom die side, at the same time as the operating travel of the apparatus or the joining tongs. Advantageously, the compensation movement is carried out by the driven movement of the stamp and/or by the driven movement of the bottom die element. The compensation movement is particularly a movement which is forcibly coupled to the drive movement. In this instance, it is preferably the case that the drive unit is also moved with the base member.

With the apparatus proposed for clinching or for setting functional elements or joining elements, for example, in machine-integrated apparatuses or joining tongs, the requirement is met of allowing an optimized movement, which particularly includes a compensation movement, of the base member.

In machine-integrated apparatuses, there regularly occurs the requirement to allow a movement, preferably of the entire set of joining tongs, in a joining direction or at least approximately in the joining direction. This requirement generally exists as a result of a necessary retraction of the joining tongs out of a bottom die swage on which the workpiece is supported, or as a result of free movement of the component or the component holder in order to ensure free running for a subsequent transfer movement of the workpiece. It is thereby possible to achieve free movement of the bottom die unit and/or the stamp unit away from the component, wherein the component is preferably static.

Preferably, the free movement of the entire apparatus away from the component is carried out at the same time as the free movement of the stamp unit away from the component and/or the free movement of the bottom die unit away from the component.

The retention portion or the retention or machine frame is preferably an integral component of an overall machine, such as the entire apparatus.

With the apparatus according to the present invention, it is often possible to meet requirements which occur, including combinations thereof, for example, the one-time introduction of the joining tongs into a component and/or in or on the component. The execution of a plurality of joining operations with a comparatively small free movement travel between individual processing steps and/or the movement of the joining tongs out of/away from the component and/or a transfer operation to the next component can also be achieved advantageously in a combined manner.

Furthermore, it is preferably possible to carry out with the present invention a defined movement of the apparatus or joining tongs relative to the component during the joining process. With regard to the drive, this is particularly advantageous or necessary in the case of an inverted joining direction by changing the stamp unit and bottom die unit. In this case, it is preferable or necessary for the component to remain spatially motionless during the joining operation. To this end, it is preferably the case that, during the joining operation, the set of joining tongs is moved in the opposite direction in a synchronized manner by the path which the stamp or the rivet, the functional element or the joining element carries out into the component. The counter-movement is particularly synchronized in terms of the direction and/or amount.

With the present invention, in particular, the following advantages can be achieved:

minimal to no time loss as a result of simultaneous movements of the stamp or the bottom die element, on the one hand, and the base member or other portions, on the other hand,
 smaller or no control complexity necessary for compensation movement or for moving the base member;
 no significant or practice-relevant additional energy requirement or consumption;
 additional time advantage or shorter cycle time because, as a result of a, for example, partial opening of the joining tongs, with respect to a greater opening or complete opening, the cycle time can be further optimized or shortened, there occur partial or part-strokes both of the stamp and of the base member with the coupled movement or with the compensation movement or with the movement of the component which moves in a manner coupled with the drive movement;
 technically and structurally simple and space-saving or compact solution;
 economically advantageous or cost-effective;
 comparatively low susceptibility to failure.

The retention portion is, for example, fixed, for example, received on a building portion. Alternatively, for example, the retention portion is provided in a movable manner on a robot arm. The component, for example, a plate-like workpiece, has, for example, one layer or multiple layers or comprises a plurality of material layers.

The actuation element is preferably a linear movement element, such as, for example, a component of a piston/cylinder drive, such as, for example, a working piston of the apparatus or the joining tongs. The drive unit is optionally particularly a hydropneumatic, pneumatic, hydraulic and/or electric drive unit. The electric drive unit preferably comprises an electric motor, preferably an electric spindle drive.

Advantageously, the control device comprises a guide path and a guide member which can be moved along the guide path, preferably a guide member which can be moved along the guide path in a displaceable manner. The guide path can provide a guide curve for the curve-guided guide member. With the preferably curve-guiding or path-guiding control device, the coupling between the driven movement of the actuation element or the stamp or the bottom die element and the retention portion is brought about. As a result, preferably the movement or position particularly of the base member relative to the retention portion is predetermined in accordance with the movement of the actuation element. As a result, a compensation movement of the base member can be configured particularly in accordance with the travelled movement path of the stamp or the bottom die element and therefore in accordance with a spacing of a driven movable free end of the stamp and/or the bottom die element relative to the component.

It is therefore possible advantageously to predetermine particularly a compensation movement which is predetermined with the movement of the base member, for example, a pivot movement of the base member about the bearing location thereof on the retention portion, and therefore of the stamp and/or bottom die unit, before and/or after the actual deformation of the component. The compensation movement is particularly adapted to the driven movement of the stamp and/or the bottom die element. A movement path and a movement position of the base member can preferably be configured in a precisely reproducible manner in spatial and chronological terms and, in particular, compensated for with a drive movement. The compensation is preferably carried out in both opposite directions along the guide path. In this case, it is also possible for the control device to be constructed so that during the movement of the actuation element, that is to say, with the drive unit running, there exists a phase in which no movement of the base member relative to the retention portion is carried out. Only a relative movement between, for example, the stamp and the component, is then carried out, corresponding to a conventional joining operation with an idle bottom die unit and idle holding-down member which surrounds the stamp.

One advantage involves the fact that the guide path is constructed on the retention portion. In principle, the retention portion may be in one piece, two pieces or multiple pieces, preferably in one piece. For example, a portion, which faces the drive unit with the actuation element, of the retention portion may have the guide path. The portion of the retention portion with the guide path, for example, faces away from a portion of the retention portion which is fixed to a fixed device or, for example, a spatially movable robot arm.

The guide path is adapted in a suitable manner, for example, as a particularly elongate simple or double or multiple curve path so that a guide element which is adapted to the guide path, for example, a pin, a roller or a bolt, can be moved in the guide path in a continuously guided, smoothly sliding and uniform and jerk-free manner.

Advantageously, the control device comprises a slotted guide member. The slotted guide member preferably comprises a slotted control member having a gear mechanism element. The slotted guide member comprising, for example, a guide path on the retention portion and a gear mechanism element which is movable along the guide path in a guided manner, can be provided easily, is space-saving, stable and advantageous for reliably guided movement. The path-guided gear mechanism element is preferably a guide member on the actuation element. A guide path is preferably a recess, for example, in the manner of an elongate hole, straight and/or bent and/or with an angular extent, for example, in a thin, flat material, such as a sheet metal portion. Preferably, corresponding aligned portions of the guide path are constructed in two opposite, preferably parallel-orientated sheet metal portions, in particular in precisely two sheet metal portions which are spaced apart in the direction of a normal of a sheet metal portion and which have a free intermediate region therebetween.

The guide path is curved at least partially in the extent thereof, for example, in a continuous and/or non-continuous manner.

For example, the guide path, for example, the slotted guide member path, is adapted in such a manner that a movement of the base member or a movement of the stamp and/or bottom die unit or a bottom die element of the bottom die unit relative to the component during the joining or setting operation is avoided or virtually avoided.

Another advantage is afforded when the control device is configured in accordance with the knuckle-lever principle. It is thereby advantageously possible to provide lever forces and torques. As a result, the movement coupling between the actuation element and base member can advantageously be provided. Preferably, the movement coupling which can be provided with the control device between the driven linear movement of the actuation element and the movement of the base member is configured relative to the retention portion in accordance with the principle of the knuckle-lever coupling.

It is further advantageous that the control device comprises a guide member which is connected to the actuation element. The guide member is preferably connected to the actuation element in a fixed and preferably rigid manner. The preferably externally spherical or convex guide member, such as, for example, a pin, a roller, a pinion, a friction wheel or a bolt, runs along a guide path, such as, for example, the path of a slotted guide member. The guide path has, for example, planar or contoured portions, such as, for example, tooth-profile-like portions, which move into effective contact with the outer side of the guide member. In accordance with the actuation element movement, preferably a linear movement, the guide member is linearly movable with the drive unit or moves in a manner fixedly coupled to the actuation element.

According to the invention, the bearing location comprises a rotary bearing. A rotary bearing can be configured in a simple, space-saving and stable manner.

The rotary axis which is constructed with the rotary bearing is preferably perpendicular to the joining axis or perpendicular to the movement direction of the linearly movable actuation element. The rotary bearing comprises, for example, an elongate bearing pin which engages, for example, releasably through openings in the base member and/or retention portion, or which engages, for example, through a bearing opening which corresponds to the bearing pin or preferably through two or more mutually spaced apart corresponding bearing openings. The at least one bearing opening is preferably present in the retention portion. The rotary bearing is preferably in the form of a sliding bearing or a roller body bearing. For example, the rotary bearing comprises as a bearing pin a screw, which can be inserted axially through mutually aligned openings and which can be secured axially, for example, with a screw-on nut.

Since the actuation element is also moved with the, for example, pivot movement of the base member at the bearing location relative to the retention portion during the driven stamp and/or bottom die movement, movement phases in which the spatial orientation or the inclination of the joining axis changes are not excluded.

According to an advantageous variant, the bearing location comprises an axial bearing. The bearing location between the retention portion, such as, for example, a retention frame or machine frame, and the base member, such as, for example, the counter-force frame, is preferably an axial bearing comprising, for example, a linearly displaceable carriage. A linear movement, for example, obliquely relative to a spatially fixed spatial axis can be predetermined at the bearing location of the base member on the retention portion. An axial bearing is also referred to as a longitudinal bearing, pressure bearing or track bearing.

According to a modification of the present invention, a pressure-reduction device is provided in order to mechanically reduce the pressure on the control device. As a result, forces and/or torques which act on or at the component of the control device, such as, for example, a guide path and/or on the guide member which can be moved along the guide path are reduced up to a non-critical range so that only tolerable friction effects occur and/or no permanent or plastic deformations of components of the control device occur.

The pressure-reduction device preferably comprises an additional element which particularly acts counter to the acting influences of gravitational force. Such an element provides forces and/or torques and comprises, for example, a spring or a pneumatic device having a pneumatic cylinder and a pneumatic piston and/or a hydraulic device. As a result of the convex shape, the guide member can be constructed in a simple and stable manner. Furthermore, therefore, the guide member is advantageously configured with respect to friction influences between the guide member and portions of the guide path. Tilting, jerking or blocking of the guide member in the guide path during the movement in the guide path can advantageously be minimized or avoided.

The guide member is externally preferably spherical or, for example, circular in cross section, elliptical or cylindrical in terms of shape. The guide member is, for example, in the form of a roller, cylinder, bolt or pin.

Advantageously, the control device is constructed in such a manner that the position of the base member relative to the retention portion remains unchanged during a clinching operation or during a setting operation. This is accordingly generally the case only in phases or not over the entire time of the stamp or actuation element which moves in a driven manner. As a result, it is possible to optimize a desired operation management. In particular, during the driven movement of the stamp or the bottom die element, phases in which the base member stops, for example, in order to fix and/or support the component, for example, continuously, are also possible.

It is also advantageous if the control device is constructed in such a manner that during a clinching operation or during a setting operation the direction and the amount of the movement of the bottom die unit are counter to the direction and amount of the movement of the stamp. This applies, for example, in the case that the bottom die unit is provided at the active side of the drive unit or the working piston or when the drive is carried out or it is driven at the bottom die unit side. The bottom die unit is then at the side of the actuation element or it is connected to the bottom die component which is moved in a driven manner.

The time/path movement profile of the bottom die unit during the joining or setting operation corresponds at least virtually to the oppositely directed movement profile of the stamp. As a result, for example, it is possible for the component to remain at rest at least virtually relative to the retention portion or the machine frame and the base member or the counter-force frame.

Finally, it is advantageous for the apparatus to be in the form of a set of joining tongs with a C-shaped bracket. This also applies to all the other apparatuses of the present invention. This arrangement is an advantageous construction. The C-shaped set of joining tongs is, for example, fixed to the wall or can be attached to a robot arm and moved spatially. The C-shaped bracket at least substantially forms the base member.

DESCRIPTION OF THE FIGURES

Additional features and advantages of the present invention are explained in greater detail with reference to a highly schematically shown exemplary embodiment.

DETAILED DESCRIPTION OF THE INVENTION

Figure 1:
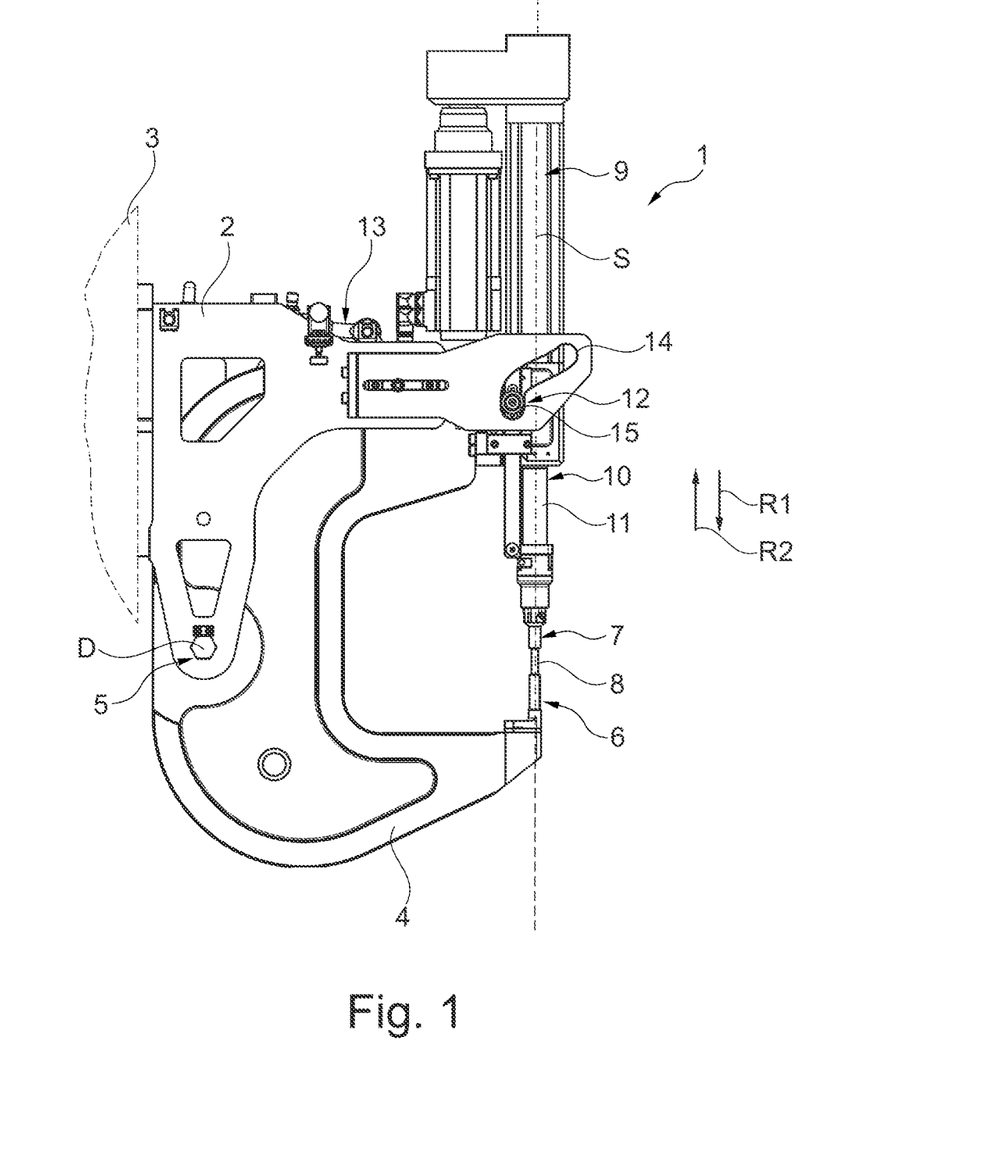
FIG. 1 shows a side view of an apparatus for clinching or setting an element.

FIG. 1 shows a completely moved-together or closed apparatus 1 for clinching a component B or for setting a joining, functional or connection element on the component B. The apparatus 1 is, for example, in the form of a set of joining, clinching or stamping tongs. The apparatus 1 having a joining axis S is in the specific exemplary embodiment in the form of a clinching tool or tool for clinching or clinch-joining.

The apparatus 1 comprises a retention portion 2, with which the apparatus 1 can be positioned on a receiving member 3, which is indicated with broken lines, such as a robot arm or a wall in the environment. The retention portion 2 acts as a retention frame or machine frame. Furthermore, the apparatus 1 has a base member 4 which is supported via a bearing location 5 on the retention portion 2. The bearing location 5 is constructed in such a manner that the base member 4 has at least one open, spatial degree of freedom. In this instance, for example, the bearing location 5 is a rotary bearing with a rotation axis D transverse to the joining axis S. The base member 4 is preferably in the form of a C-shaped frame or C-shaped bracket and acts as a counter-force frame relative to the retention portion 2.

A bottom die unit 6 and a stamp unit 7 which is opposite the bottom die unit 6 and which has a stamp 8 are received on the base member 4. In order to reversibly move the stamp 8, there is provided a drive unit 9 which reversibly drives a linearly movable actuation element 10 which is coupled to the stamp 8 along the joining axis S of the apparatus 1 in order to act on a component B which is provided between the stamp unit 7 and the bottom die unit 6 (see FIGS. 4 to 10).

The actuation element 10 which is formed in the exemplary embodiment by a working piston 11 which can be moved in a driven manner along the joining axis S linearly with the drive unit 9 is driven with the drive unit 9, for example, a pressing drive. The actuation element 10 or the working piston 11 is connected at the front to the stamp 8.

The joining axis S is a movement axis or coincides with the longitudinal center axis of the actuation element 10 or the working piston 11 and the stamp 8 and goes through the bottom die unit 6 (cf. FIG. 1).

The base member 4 is movable via the bearing location 5 relative to the retention portion 2 or can be pivoted about the rotation axis D back and forth. There is further provided a mechanical coupling which is in the form of a control device 12 between the actuation element 10 and the retention portion 2. The control device 12 predetermines that, in accordance with the position of the actuation element 10 along the joining axis S as a result of the driven movement of the actuation element 10, the position of the base member 4 is predetermined relative to the retention portion 2.

There is further provided an additional element as a pressure-reduction device 13 in order to provide a mechanical pressure reduction of elements of the control device 12, particularly with respect to dynamic and static loads or gravitational force influences.

The control device 12 comprises a guide path 14 and a guide member 15 which is movable or displaceable along the guide path 14. The guide path 14 is, for example, a slotted path of a slotted guide member and is constructed at precisely one or two opposing sheet metal portions of the retention portion 2 in a region which extends up to the drive unit 9 with the actuation element 10. The guide path 14 has, by way of example, a straight path portion which is orientated obliquely to the joining axis S and which merges via a curved path portion into a shorter additional straight path portion. The shorter path portion is orientated here in the direction of the joining axis S.

The guide member 15 is, for example, a bolt which is connected to the actuation element 10 or the working piston 11. A longitudinal axis of the bolt is orientated transversely to the longitudinal axis of the working piston 11.

Figure 2:
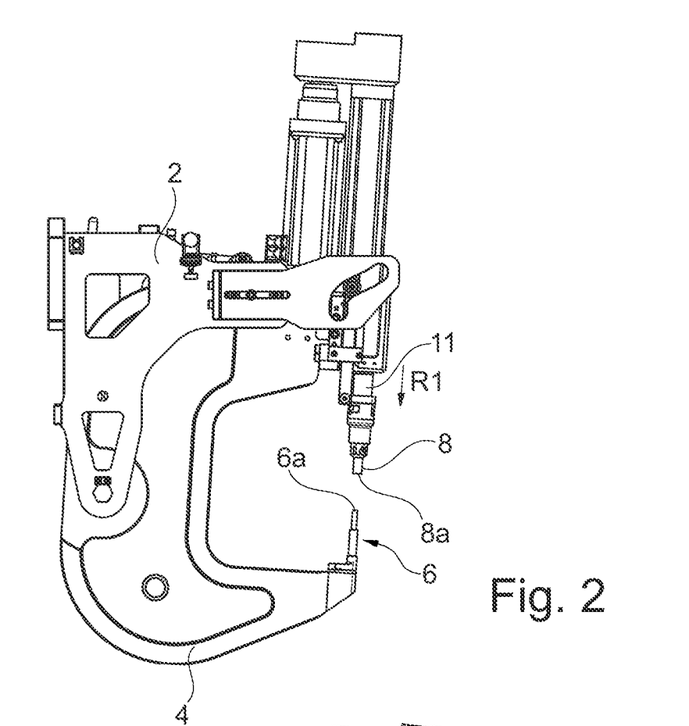
FIG. 2 shows the apparatus according to FIG. 1 in a partially opened state.
Figure 3:
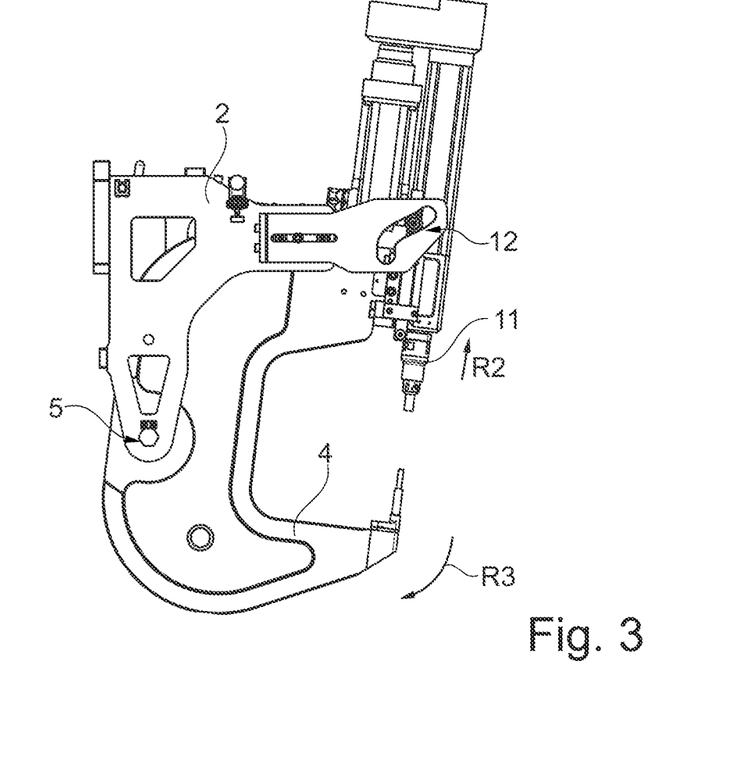
FIG. 3 shows the apparatus according to FIG. 1 in an opened state.

FIGS. 2 and 3 depict the relationship of the movement or position of the working piston 11 or the actuation element 10 and the orientation of the base member 4 and therefore of the apparatus portions which are received thereon, such as the bottom die unit 6, stamp unit 7 and drive unit 9, relative to the retention portion 2.

In an apparatus 1 which is partially open in FIG. 2, the actuation element 10 or the working piston 11 or the stamp 8 is extended a comparatively long way in the joining or linear movement direction R1 or toward the bottom die unit 6. For example, a free front side 8a of the stamp 8 is slightly spaced apart from an opposite support side 6a of the bottom die unit 6. The spacing is preferably precisely so great for the partial opening that, according to a generally variable respective height of the component B, it can still just be introduced between the front side 8a and the support side 6a without collisions. In a comparatively short cycle time, the set of joining tongs can then be closed, wherein directly after the closure the actual processing operation of the component begins.

Figure 7:
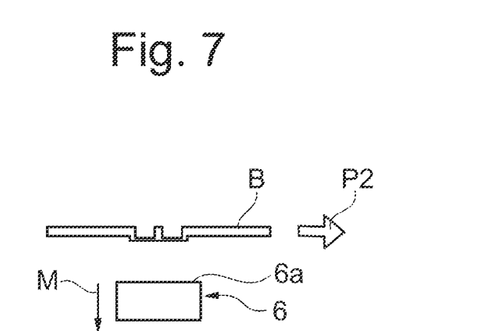
FIG. 7 shows the cutout according to FIG. 6, wherein the portion of the bottom die unit is moved away from the component.
Figure 8:
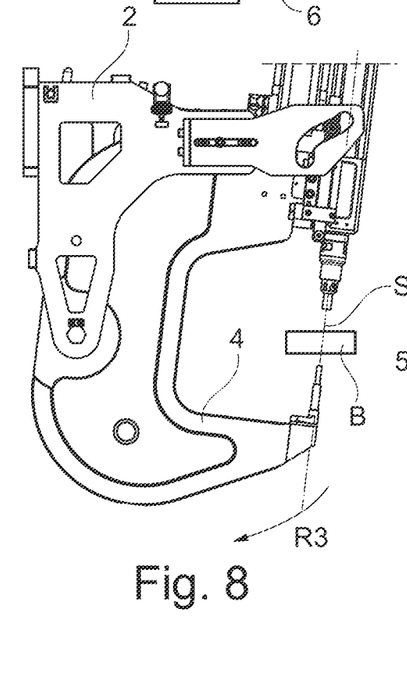
FIG. 8 shows the opened apparatus according to FIG. 1 with a component which is positioned ready for processing during movement toward the component.

Before and after the actual processing operation on the component B, the open position, which is shown according to FIG. 3, of the apparatus 1 is taken up with an actuation element 10, which is partially or completely retracted in a movement direction R2, or the working piston 11 or the stamp 8. This may be the case, for example, with a robot arm 3 which is moved toward the component B with the apparatus 1. The open position is carried out in a controlled manner or automatically in accordance with the position of the actuation element 10. The component B has enough space between the stamp unit 7 and the bottom die unit 6 to be introduced or placed, that is to say, to be moved back and forth laterally, which FIG. 8 shows, for example, for the movement of the component B in the direction P1 (cf. FIG. 10) between the stamp unit 7 and bottom die unit 6. FIG. 7 shows that the completely processed component B is transported onward or transferred in the direction P2, away out of the region between the stamp unit 7 and bottom die unit 6 which are spaced apart from each other by a sufficient distance in this case.

Figure 10:
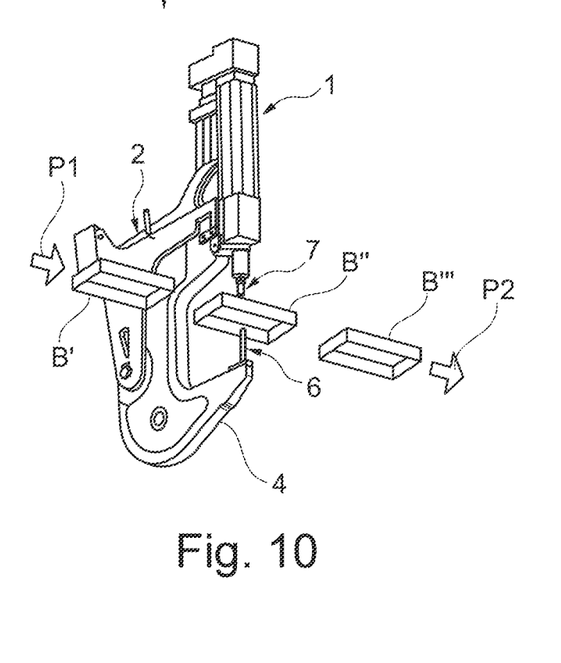
FIG. 10 shows the arrangement according to FIG. 9 as an oblique perspective view with three components, the transfer movement of which relative to the apparatus is indicated.

FIG. 10 shows that, for a timed processing of a plurality of components B', B'', B''' one after the other, the processing of individual components is carried out by transport in the direction P1 of the component B1 which is not yet processed toward the apparatus, the component B'' is currently being processed and the component B''' has already been processed and is transported away in the direction P2 (cf. also FIG. 7).

Figure 5:
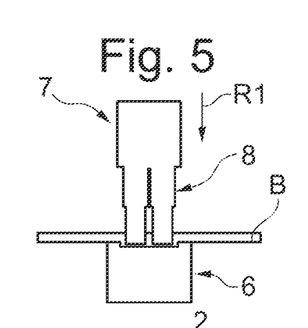
FIG. 5 shows the cutout according to FIG. 4 with a bottom die unit and with a portion of a stamp unit of the apparatus according to FIG. 1 at the end of a clinching operation of the component with the component which is being formed in this instance.
Figure 6:
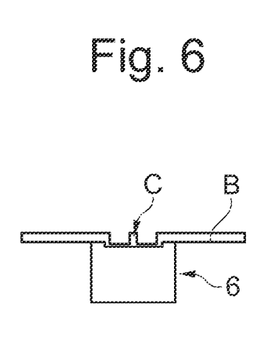
FIG. 6 shows the cutout according to FIG. 5, wherein the portion of the stamp unit is moved away.
Figure 9:
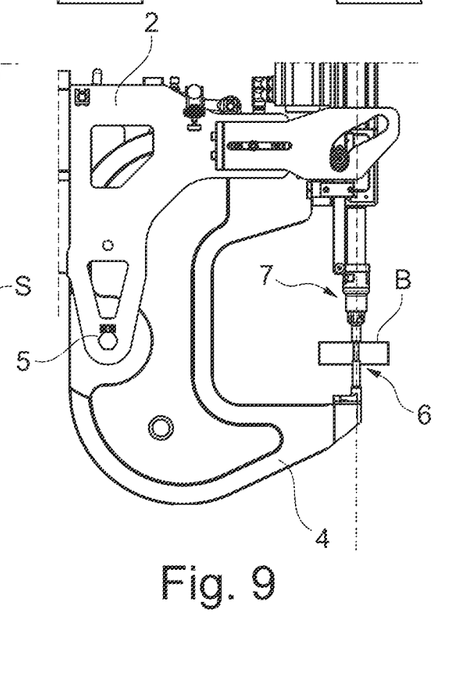
FIG. 9 shows the arrangement according to FIG. 8 with the apparatus closed during the forming of the component.

According to the processing position with the apparatus 1 closed from FIGS. 5 and 9, the joining axis S is preferably perpendicular to a face which is intended to be processed on the component B.

According to FIG. 8, the stamp unit 7 and bottom die unit 6 are moved apart, the apparatus 1 or the set of joining tongs is opened and the joining axis S is oblique relative to the face, which is intended to be processed on the component B, of the component B which has approached.

FIGS. 4 to 7 show steps which take place one after the other on the component B during the processing thereof with the apparatus 1. In FIGS. 8 to 10, the respective position of the apparatus 1 in the associated processing step of the component B is illustrated as a perspective view.

Figure 4:
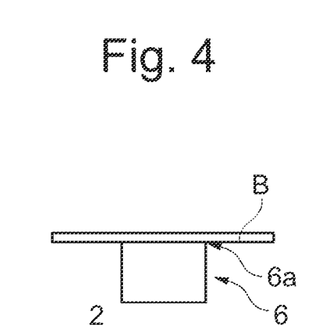
FIG. 4 shows a portion of a component with a portion, which adjoins it, of a bottom die unit of the apparatus according to FIG. 1.

According to FIG. 4, the component B which is intended to be processed is placed on the support side 6a of the bottom die unit 6 with a partially opened set of clinching tongs or partially opened apparatus 1. The stamp 8 is still spaced apart from the component B.

According to FIG. 5, the stamp 8 which is in the form of a double stamp is introduced with a movement of the stamp 8 into the component and deforms it in a double clinch point C on the component B. In this case, the actuation element 10 or the working piston 11 moves in a driven manner in the direction R1 (cf. FIGS. 5, 9). After the deformation, the stamp 8 moves in a driven manner back in the direction R2, away from the component B.

In this case, the base member 4 pivots, in a state coupled via the control device 12, in the direction R3 away from the component B with further movement of the actuation element 10 in the direction R2 (cf. FIG. 3). The bottom die unit 6 moves away from the component B in the direction M, which is carried out by pivoting the base member 4 and the elements, which are present thereon, of the apparatus 1 in the clockwise direction in the direction R3 (cf. FIG. 3) about the bearing location 5. The component B is free from the stamp and bottom die unit and is moved further in the transfer direction P2 relative to the bottom die unit 6, which can be carried out by, for example, a transfer device (not shown).

LIST OF REFERENCE NUMERALS

1 Apparatus
2 Retention portion
3 Receiving member
4 Base member
5 Bearing location
6 Bottom die unit
6a Support side
7 Stamp unit
8 Stamp
8a Front side
9 Drive unit
10 Actuation element
11 Working piston
12 Control device
13 Pressure-reduction device
14 Guide path
15 Guide member

The invention claimed is:

1. An apparatus for clinching a component or for setting a joining element or a functional element on a component, comprising:
 a retention portion, with which the apparatus can be positioned on a receiving member in the environment, and
 a base member which is supported via a bearing location on the retention portion, and
 wherein a bottom die unit having a bottom die element is received on the base member and the apparatus further comprises a stamp unit which is opposite the bottom die unit and which has a stamp,
 wherein there is provided in order to move the stamp and/or the bottom die element a drive unit which reversibly drives a linearly movable actuation element, wherein the linearly movable actuation element is directly coupled to the stamp unit or the bottom die unit, along a joining axis of the apparatus in order to act on the component which is present between the stamp unit and the bottom die unit,
 wherein the base member is movable via the bearing location relative to the retention portion,
 wherein a control device is constructed between the actuation element and the retention portion in such a manner that a position of the base member relative to the retention portion is predetermined in accordance with a position of the actuation element along the joining axis as a result of a driven movement of the actuation element,
 wherein the bearing or an axial bearing location comprises a rotary bearing, and
 wherein the joining axis of the apparatus coincides with a longitudinal center axis of the linearly movable actuation element.

2. The apparatus as claimed in claim 1, wherein the control device comprises a guide path and a guide member which can be moved along the guide path.

3. The apparatus as claimed in claim 1, wherein a guide path is constructed on the retention portion.

4. The apparatus as claimed in claim 1, wherein the control device comprises a slotted guide member.

5. The apparatus as claimed in claim 1, wherein the control device comprises a guide member which is connected to the actuation element.

6. The apparatus as claimed in claim 1, wherein a rotary axis of the rotary bearing is perpendicular to a joining axis or perpendicular to a movement direction of the linearly movable actuation element.

7. The apparatus as claimed in claim 1, further comprising a pressure-reduction device to mechanically reduce the pressure on the control device.

8. The apparatus as claimed in claim 1, wherein a guide member is externally formed in a convex manner.

9. The apparatus as claimed in claim 1, wherein the control device is constructed in such a manner that the position of the base member relative to the retention portion remains unchanged during a clinching operation or during a setting operation.

10. The apparatus as claimed in claim 1, wherein the control device is constructed in such a manner that during a clinching operation or during a setting operation a direction and an amount of a movement of the bottom die unit are counter to a direction and amount of a movement of the movement of the stamp.

11. The apparatus as claimed in claim 1, wherein the bottom die unit and the stamp unit along with a C-shaped bracket form a set of joining tongs, and
   wherein the C-shaped bracket at least substantially forms the base member.

* * * * *